US010232529B2

(12) United States Patent
Xu et al.

(10) Patent No.: US 10,232,529 B2
(45) Date of Patent: Mar. 19, 2019

(54) SUPPORT MATERIAL AND APPLICATIONS THEREOF

(71) Applicant: 3D Systems, Incorporated, Rock Hill, SC (US)

(72) Inventors: Pingyong Xu, Valencia, CA (US); Khalil Moussa, Chapel Hill, NC (US); John Stockwell, Sylmar, CA (US)

(73) Assignee: 3D Systems, Inc., Rock Hill, SC (US)

( * ) Notice: Subject to any disclaimer, the term of this patent is extended or adjusted under 35 U.S.C. 154(b) by 371 days.

(21) Appl. No.: 15/353,297

(22) Filed: Nov. 16, 2016

(65) Prior Publication Data

US 2017/0066199 A1    Mar. 9, 2017

Related U.S. Application Data

(60) Division of application No. 13/871,462, filed on Apr. 26, 2013, now Pat. No. 9,534,103, which is a continuation of application No. 13/032,936, filed on Feb. 23, 2011, now Pat. No. 8,460,451.

(51) Int. Cl.

| | |
|---|---|
| *B29C 33/52* | (2006.01) |
| *B33Y 70/00* | (2015.01) |
| *C08L 91/06* | (2006.01) |
| *C08K 5/05* | (2006.01) |
| *B33Y 10/00* | (2015.01) |
| *B33Y 30/00* | (2015.01) |
| *B33Y 50/02* | (2015.01) |
| *B29C 33/40* | (2006.01) |
| *B29C 35/08* | (2006.01) |
| *C09D 191/06* | (2006.01) |
| *C09K 5/06* | (2006.01) |
| *B29C 64/106* | (2017.01) |
| *B29C 64/112* | (2017.01) |
| *B29C 64/386* | (2017.01) |
| *B29C 64/40* | (2017.01) |
| *C09D 7/63* | (2018.01) |
| *B41M 5/50* | (2006.01) |
| *B29K 75/00* | (2006.01) |

(52) U.S. Cl.
CPC .............. *B29C 33/52* (2013.01); *B29C 33/40* (2013.01); *B29C 35/0805* (2013.01); *B29C 64/106* (2017.08); *B29C 64/112* (2017.08); *B29C 64/386* (2017.08); *B29C 64/40* (2017.08); *B33Y 10/00* (2014.12); *B33Y 30/00* (2014.12); *B33Y 50/02* (2014.12); *B33Y 70/00* (2014.12); *C08K 5/05* (2013.01); *C08L 91/06* (2013.01); *C09D 7/63* (2018.01); *C09D 191/06* (2013.01); *C09K 5/066* (2013.01); *B29C 2035/0827* (2013.01); *B29C 2035/0833* (2013.01); *B29C 2035/0838* (2013.01); *B29K 2075/00* (2013.01); *B29K 2891/00* (2013.01); *B29K 2995/0062* (2013.01); *B41M 5/508* (2013.01); *Y10T 428/24802* (2015.01)

(58) Field of Classification Search
CPC ..................................................... B29C 33/52
See application file for complete search history.

(56) References Cited

U.S. PATENT DOCUMENTS

| | | |
|---|---|---|
| 3,089,782 A | 5/1963 | Bush et al. |
| 3,776,742 A | 12/1973 | Sanders |
| 3,804,640 A | 4/1974 | Buckwalter |
| 4,247,508 A | 1/1981 | Householder |
| 4,567,570 A | 1/1986 | Peer |
| 4,575,330 A | 3/1986 | Hull |
| 4,623,688 A | 11/1986 | Flanagan |
| 4,665,492 A | 5/1987 | Masters |
| 4,741,930 A | 5/1988 | Howard et al. |
| 4,751,102 A | 6/1988 | Adair et al. |
| 4,752,352 A | 6/1988 | Feygin |
| 4,772,530 A | 9/1988 | Gottschalk et al. |
| 4,772,541 A | 9/1988 | Gottschalk et al. |
| 4,775,945 A | 10/1988 | Cavill et al. |
| 4,863,538 A | 9/1989 | Deckard |
| 4,961,154 A | 10/1990 | Pomerantz et al. |
| 4,992,806 A | 2/1991 | Peer |
| 4,999,143 A | 3/1991 | Hull et al. |
| 5,001,354 A | 3/1991 | Gould et al. |
| 5,015,312 A | 5/1991 | Kinzie |
| 5,015,424 A | 5/1991 | Smalley |
| 5,031,120 A | 7/1991 | Pomerantz et al. |
| 5,059,266 A | 10/1991 | Yamane et al. |
| 5,121,329 A | 6/1992 | Crump |
| 5,122,187 A | 6/1992 | Schwarz et al. |
| 5,134,569 A | 7/1992 | Masters |

(Continued)

FOREIGN PATENT DOCUMENTS

| | | |
|---|---|---|
| DE | 19507881 | 9/1995 |
| EP | 0322257 | 6/1989 |

(Continued)

OTHER PUBLICATIONS

PCT International Search Report for International Application No. PCT/US2012/026080.
PCT Written Opinion of the International Search Authority for International Application No. PCT/US2012/026080.
PCT Written Opinion of the International Searching Authority for International Application No. PCT/US2012/026080 dated Sep. 6, 2013 (7 pages).
English Translation of Chinese First Office Action dated Dec. 29, 2014 (9 pages).

(Continued)

*Primary Examiner* — Larry W Thrower

(57) ABSTRACT

In one aspect, support materials operable for use in 3D printing systems are described herein. In some embodiments, a support material comprises a wax component comprising at least one ethoxylated fatty alcohol and a viscosity modifying agent, wherein the support material is water dispersible. In some embodiments, the wax component comprises a mixture of at least one fatty alcohol and at least one ethoxylated fatty alcohol.

9 Claims, No Drawings

(56) References Cited

U.S. PATENT DOCUMENTS

| | | |
|---|---|---|
| 5,136,515 A | 8/1992 | Helinski |
| 5,141,680 A | 8/1992 | Almquist et al. |
| 5,143,663 A | 9/1992 | Leyden et al. |
| 5,149,548 A | 9/1992 | Yamane et al. |
| 5,182,715 A | 1/1993 | Yorgitch et al. |
| 5,198,159 A | 3/1993 | Nakamura et al. |
| 5,204,055 A | 4/1993 | Sachs et al. |
| 5,209,878 A | 5/1993 | Smalley et al. |
| 5,273,691 A | 12/1993 | Hull et al. |
| 5,282,140 A | 1/1994 | Tazawa et al. |
| 5,313,232 A | 5/1994 | Peer |
| 5,340,656 A | 8/1994 | Sachs et al. |
| 5,398,193 A | 3/1995 | deAngelis |
| 5,453,121 A | 9/1995 | Nicholls et al. |
| 5,510,066 A | 4/1996 | Fink et al. |
| 5,514,209 A | 5/1996 | Larson, Jr. |
| 5,574,084 A | 11/1996 | Peacock |
| 5,740,051 A | 4/1998 | Sanders, Jr. et al. |
| 5,855,836 A | 1/1999 | Leyden et al. |
| 5,936,027 A | 8/1999 | Zahrobsky et al. |
| 5,938,826 A | 8/1999 | Baker et al. |
| 5,956,169 A | 9/1999 | Titterington et al. |
| 5,959,020 A | 9/1999 | Oliveri et al. |
| 6,010,564 A | 1/2000 | Zhu et al. |
| 6,132,665 A | 10/2000 | Bui et al. |
| 6,133,355 A | 10/2000 | Leyden et al. |
| 6,193,922 B1 | 2/2001 | Ederer |
| 6,193,923 B1 | 2/2001 | Leyden et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,339,112 B1 | 1/2002 | Kauffman et al. |
| 6,379,444 B1 | 4/2002 | Adkins et al. |
| 6,395,811 B1 | 5/2002 | Nguyen et al. |
| 6,487,897 B1 | 10/2002 | Wu et al. |
| 6,476,122 B1 | 11/2002 | Leyden |
| 6,508,971 B2 | 1/2003 | Leyden et al. |
| 6,569,373 B2 | 5/2003 | Napadensky |
| 6,644,763 B1 | 11/2003 | Gothait |
| 6,650,209 B2 | 12/2003 | Leyden et al. |
| 6,658,314 B1 | 12/2003 | Gothait |
| 6,702,884 B2 | 3/2004 | Brown et al. |
| 6,713,125 B1 | 3/2004 | Sherwood et al. |
| 6,841,116 B2 | 1/2005 | Schmidt |
| 6,841,589 B2 | 1/2005 | Schmidt et al. |
| 7,176,253 B2 | 2/2007 | Xu et al. |
| 7,378,460 B2 | 5/2008 | Schmidt et al. |
| 7,399,796 B2 | 7/2008 | Xu et al. |
| 7,578,874 B2 | 8/2009 | Benjamin et al. |
| 2002/0171177 A1 | 11/2002 | Kritchman et al. |
| 2003/0069323 A1 | 4/2003 | Varlemann et al. |
| 2003/0100658 A1 | 5/2003 | Xu et al. |
| 2003/0107158 A1 | 6/2003 | Levy |
| 2003/0127021 A1 | 7/2003 | Brown |
| 2010/0124611 A1 | 5/2010 | Mayo et al. |

FOREIGN PATENT DOCUMENTS

| | | |
|---|---|---|
| EP | 0388129 | 9/1990 |
| EP | 0223587 | 2/1991 |
| EP | 0426363 | 5/1991 |
| EP | 0500225 | 8/1992 |
| EP | 0590957 | 4/1994 |
| EP | 0655317 | 5/1995 |
| EP | 0666163 | 8/1995 |
| EP | 1033222 | 9/2000 |
| GB | 2336594 | 10/1999 |
| JP | 64-061230 | 3/1989 |
| JP | 02-022036 | 1/1990 |
| JP | 5-33901 | 5/1993 |
| JP | 6200204 | 7/1994 |
| JP | 04-164975 | 6/1996 |
| JP | 63-139729 | 6/1998 |
| WO | 91/12120 | 8/1991 |
| WO | 92/00820 | 1/1992 |
| WO | 94/19112 | 9/1994 |
| WO | 95/05935 | 3/1995 |
| WO | 95/05943 | 5/1995 |
| WO | 95/12485 | 5/1995 |
| WO | 9960508 | 11/1999 |
| WO | 00/11092 | 3/2000 |
| WO | 01/26023 | 4/2000 |
| WO | 00/52624 | 9/2000 |
| WO | 00/76772 | 12/2000 |
| WO | 01/68375 | 9/2001 |
| WO | 2010045147 | 4/2010 |
| WO | 20100132392 | 11/2010 |

OTHER PUBLICATIONS

JEEN International Corporation, Material Safetry Data Sheet JEECOL CS-20-D (Sep. 1999).

Material Safety Data Sheet Ceteareth-25, Personalformulator.com (Jan. 1013).

DIY Material Guide: Polymorph plastic, Instructables, published (2008).

SUPPORT MATERIAL AND APPLICATIONS THEREOF

CROSS-REFERENCE TO RELATED APPLICATIONS

This application is a divisional of U.S. patent application Ser. No. 13/871,462, filed Apr. 26, 2013, which is a continuation of U.S. patent application Ser. No. 13/032,936, filed Feb. 23, 2011, now U.S. Pat. No. 8,460,451, each of which is hereby incorporated by reference in its entirety.

FIELD OF THE INVENTION

The present invention relates to support materials for three dimensional (3D) printing systems and, in particular, to water dispersible support materials.

BACKGROUND OF THE INVENTION

Commercially available three dimensional printers, such as the ProJet™ 3D Printers manufactured by 3D Systems of Rock Hill, S.C., use a build material or ink that is jetted through a print head as a liquid to form various thermopolymer parts. Other three dimensional printing systems also use a build material that is jetted through a print head. In some instances, the build material is solid at ambient temperatures and converts to liquid at elevated jetting temperatures. In other instances, the build material is liquid at ambient temperatures.

Moreover, production of a three-dimensional part in a 3D printing system often requires the use of a support material in conjunction with the build material. The support material is also jetted through a print head as a liquid and consists of hydrophobic chemical species that are solid at ambient temperatures and liquid at elevated jetting temperatures. However, unlike the build material, the support material is subsequently removed to provide the finished three-dimensional part.

Removal of the support material can be administered through several processes, including heating the support material to a temperature above its melting point in conjunction with the use of a suitable organic carrier to sufficiently remove the support material from the build material. In some cases, the organic carrier deposits an undesirable oily residue on the completed three-dimensional part. Furthermore, the use of elevated temperatures in addition to a suitable organic carrier, in some situations, can compromise the mechanical integrity of the finished three-dimensional part resulting in part deformation or failure.

SUMMARY OF THE INVENTION

In view of the foregoing, phase change support materials operable for use in 3D printing systems are described herein which, in some embodiments, may offer one or more advantages over prior support materials. In some embodiments, for example, a phase change support material described herein is water dispersible, thereby precluding or reducing reliance on organic carriers to remove the support material for three-dimensional part completion.

A water dispersible phase change support material described herein is fluid at jetting temperatures encountered in 3D printing systems and solidifies by freezing once deposited on a surface during the fabrication of a three-dimensionally printed article or object. A phase change support material described herein, in some embodiments, comprises a wax component comprising at least one ethoxylated fatty alcohol and a viscosity modifying component, wherein the support material is water dispersible. In some embodiments, the wax component comprises a mixture of a plurality of ethoxylated fatty alcohols.

A phase change support material described herein, in some embodiments, comprises a wax component comprising a mixture of at least one fatty alcohol and at least one ethoxylated fatty alcohol and a viscosity modifying component, wherein the support material is water dispersible. In some embodiments, the wax component comprises a mixture of a plurality of ethoxylated fatty alcohols and one or more fatty alcohols. Moreover, in some embodiments, a support material described herein further comprises a phase change agent. In some embodiments, a phase change agent is operable to assist or accelerate the freezing of the support material when deposited in a 3D printing system.

In another aspect, compositions comprising three-dimensionally printed articles or objects are described herein. In some embodiments, a composition comprises a three-dimensionally printed article comprising a build material and a support material, the support material comprising a wax component comprising at least one ethoxylated fatty alcohol and a viscosity modifying component, wherein the support material is water dispersible. In some embodiments, a composition comprises a three-dimensionally printed article comprising a build material and a support material, the support material comprising a wax component comprising a mixture of at least one fatty alcohol and at least one ethoxylated fatty alcohol and a viscosity modifying component, wherein the support material is water dispersible. In some embodiments, the support material further comprises a phase change agent described herein.

A build material of the three-dimensionally printed article described herein, in some embodiments, comprises a curable material. A curable material, in some embodiments, comprises one or more UV curable chemical species. In some embodiments, a three-dimensionally printed article or object comprises a plurality of layers of the build material, wherein the layers of build material are deposited according to data in a computer readable format.

In another aspect, methods of printing a three-dimensional article or object are described herein. In some embodiments, a method of printing a three-dimensional article comprises selectively depositing layers of a fluid build material to form the three-dimensional article on a substrate, and supporting at least one layer of the build material with a support material, the support material comprising a wax component comprising at least one ethoxylated fatty alcohol and a viscosity modifying component. In some embodiments, a method of printing a three-dimensional article comprises selectively depositing layers of a fluid build material to form the three-dimensional article on a substrate, and supporting at least one layer of the build material with a support material, the support material comprising a wax component comprising a mixture of at least one fatty alcohol and at least one ethoxylated fatty alcohol and a viscosity modifying component. In some embodiments, the support material further comprises a phase change agent. In some embodiments, a fluid build material solidifies upon deposition. In some embodiments, a fluid build material remains substantially fluid upon deposition. Additionally, the build material and/or support material, in some embodiments of methods described herein, is selectively deposited according to an image of the three-dimensional article, the image being in a computer readable format.

A method of printing a three-dimensional article, in some embodiments, further comprises removing the support material from the build material. In some embodiments, removing the support material from the build material comprises dispersing the support material in water. Dispersing the support material in water, in some embodiments, comprises contacting the support material with flowing water or a water bath. In some embodiments, the support material is at least partially dissolved or solubilized in the water.

Moreover, in some embodiments, a method of printing a three-dimensional article further comprises disposing of the support material dispersed in water without further treatment. In some embodiments, for example, the support material dispersed and/or solubilized in water is provided to a waste water treatment system without further chemical or physical treatment prior to entry into the wastewater treatment system.

These and other embodiments are described in greater detail in the detailed description which follows.

DETAILED DESCRIPTION OF THE INVENTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention. The terms "three-dimensional printing system," "three-dimensional printer," "printing," and the like generally describe various solid freeform fabrication techniques for making three-dimensional objects by selective deposition, jetting, fused deposition modeling, and other techniques now known in the art or that may be known in the future that use both a build material to fabricate the three-dimensional object and a support material that supports the build material during the build process.

In one aspect of the present invention, phase change support materials operable for use in 3D printing systems are described herein. In some embodiments of the present invention, a phase change support material comprises a wax component comprising at least one ethoxylated fatty alcohol and a viscosity modifying component, wherein the support material is water dispersible. In some embodiments, a support material described herein is at least partially soluble in water. Moreover, in some embodiments, the wax component of a support material comprises a mixture of at least one fatty alcohol and at least one ethoxylated fatty alcohol. In some embodiments, the wax component of a support material comprises a mixture of a plurality of fatty alcohols and a plurality of ethoxylated fatty alcohols.

Fatty alcohols suitable for use in some embodiments of a wax component of a support material described herein can comprise any fatty alcohol or mixture of fatty alcohols not inconsistent with the objectives of the present invention. In some embodiments, a fatty alcohol suitable for use in the wax component of a support material described herein has the formula $C_nH_{2n+1}OH$, wherein n is an integer from 8 to 22. In some embodiments, for example, a fatty alcohol comprises decanol ($C_{10}H_{21}OH$), dodecanol ($C_{12}H_{25}OH$), tetradecanol ($C_{14}H_{29}OH$), hexadecanol ($C_{16}H_{33}OH$), eicosanol ($C_{20}H_{41}OH$) or docosanol ($C_{22}H_{45}OH$) or mixtures thereof.

Ethoxylated fatty alcohols suitable for use in some embodiments of a wax component of a support material described herein can comprise any ethoxylated fatty alcohol not inconsistent with the objectives of the present invention. In some embodiments, an ethoxylated fatty alcohol suitable for use in the wax component of a support material described herein has the formula $CH_3-(CH_2)_m-(O-CH_2-CH_2-)_n-OH$, wherein n is an integer from 2 to 100 and m is an integer from 10 to 20. In some embodiments, for example, an ethoxylated fatty alcohol has the formula $CH_3-(CH_2)_{15-17}-(O-CH_2-CH_2-)_{20}-OH$. In some embodiments, an ethoxylated fatty alcohol comprises an ethoxylated sorbitan esterified with one or more fatty acids. In some embodiments, for example, ethoxylated fatty alcohols comprise one or more sorbitan monooctadecanoate poly(oxy-1,2-ethanediyl) derivatives.

A fatty alcohol and ethoxylated fatty alcohol can be combined or mixed in any ratio not inconsistent with the objectives of the present invention to provide a wax component. General guidelines for establishing a suitable ratio of the fatty alcohol and the ethoxylated fatty alcohol in producing a wax component can include maintaining the water dispersibility of the support material while providing sufficient mechanical integrity to the support material for use in 3D printing systems.

Additionally, in some embodiments, a wax component of a phase change support material described herein has a melting point over a broad range of temperatures applicable to 3D printing systems. In one embodiment, for example, a wax component has a melting point ranging from about 45° C. to about 55° C. In some embodiments, a wax component has a melting point ranging from about 47° C. to about 54° C.

In some embodiments, a wax component of a support material described herein is commercially available from Koster Keunen, Inc. of Watertown, Conn. under the trade designation Permulgin D.

The amount of a wax component in a support material described herein can be selected according to a variety of factors including the jetting temperatures of the 3D printing system, the desired viscosity of the support material, the required mechanical integrity of the support material for printing applications and the deposition rates of the build material and the support material. In some embodiments, a wax component is present in the support material in an amount ranging from about 50 weight percent to about 95 weight percent. In some embodiments, a wax component is present in the support material in an amount ranging from about 60 weight percent to about 90 weight percent or from about 70 weight percent to about 85 weight percent. In some embodiments, a wax component is present in the support material in an amount ranging from about 75 weight percent to about 85 weight percent or from about 80 weight percent to about 90 weight percent.

As described herein, a support material also comprises a viscosity modifying component. A viscosity modifying component, in some embodiments, can provide a support material described herein an acceptable viscosity for 3D printing applications at one or more jetting temperatures. In some embodiments, a viscosity modifying component comprises an ethoxylated fatty alcohol. In some embodiments, an ethoxylated fatty alcohol suitable for use as a viscosity modifier can comprise one or more of the ethoxylated fatty alcohols described herein for the wax component. In one embodiment, for example, a viscosity modifier comprises $CH_3-(CH_2)_{17}-(O-CH_2-CH_2-)_{20}-OH$. In some embodiments, a viscosity modifier is ETHOX SA-20 commercially available from Ethox Chemicals, LLC, Greenville, S.C. 29606. Other non-limiting examples of viscosity modifiers useful in some embodiments of the present invention include the following: ETHOX MS40, ETHOX 3482, and ETHAL LA50, all commercially available from Ethox Chemicals.

In some embodiments, a viscosity modifying component of a support material described herein comprises one or more cyclic esters, including lactones. In some embodiments, lactones comprise α-acetolactone, β-propiolactone, γ-butyrolactone, δ-valerolactone or ∈-caprolactone or mixtures thereof. In some embodiments, one or more lactones of the viscosity modifying component are in polymeric form. In one embodiment, for example, a viscosity modifying component comprises poly(∈-caprolactone). Non-limiting examples of viscosity modifying components useful in some embodiments of the present invention include the following: CAPA 1301, CAPA 2402, and CAPA 2403D, commercially available from Perstorp UK Limited, Baronet Road, Warrington, Chester WA4 6HA.

In some embodiments, a viscosity modifying component of a support material comprises a mixture of one or more ethoxylated fatty alcohols and one or more lactones, including polymerized lactones.

The identity and amount of a viscosity modifying component in a support material described herein can be selected and/or adjusted according to a variety of factors including the jetting temperatures of the 3D printing system, the required mechanical integrity of the support material for 3D printing applications and the deposition rates of the support and/or build materials. In some embodiments, a viscosity modifying component is present in a support material described herein in an amount ranging from about 3 weight percent to about 30 weight percent. In some embodiments, a viscosity modifying component is present in a support material in an amount ranging from about 5 weight percent to about 25 weight percent or from about 10 weight percent to about 20 weight percent.

A support material described herein, in some embodiments, further comprises a phase change agent. A phase change agent, in some embodiments, is operable to assist or accelerate the solidification of the support material when the support material is cooled to or below the freezing point of the material in some embodiments, a phase change agent has a sharp freezing point. In some embodiments, a phase change agent has a freezing point over a narrow range of temperatures. In some embodiments, for example, a phase change agent freezes or solidifies over a temperature range of about 1° C. to about 3° C. In some embodiments, a phase change agent having a sharp freezing point freezes or solidifies over a temperature range of X±0.5° C., where X is the temperature at which the freezing point is centered (e.g., X=45° C.).

In some embodiments, a phase change agent comprises one or more urethane waxes. In some embodiments, urethane waxes can comprise inert urethane waxes or reactive urethane waxes. Reactive urethane waxes, in some embodiments, have one or more reactive functional groups.

In some embodiments, a urethane wax is selected from a class of inert linear urethane waxes having the chemical formula $C_{18}H_{37}NRCOOC_nH_{(2n+1)}$ wherein n is an integer from 4 to 16, and R is H or C1-C20 alkyl. In some embodiments R is H. In some embodiments, R is C1-C6 alkyl. In some embodiments, R is C1-C10 alkyl. In some embodiments, R is C1-C20 alkyl. In some embodiments, a urethane wax is selected from a class of reactive linear urethane waxes having the formula $C_nH_{(2n+1)}NRC(O)OC_mH_{2m}OC(O)C(CH_3)=CH_2$ wherein n is an integer from 12 to 18, m is an integer from 2 to 12, and R is H or C1-C20 alkyl. In some embodiments R is H. In some embodiments, R is C1-C6 alkyl. In some embodiments, R is C1-C10 alkyl. In some embodiments, R is C1-C20 alkyl. A urethane wax, in some embodiments, is selected from a class of reactive urethane waxes having the formula $C_nH_{(2n+1)}O(O)CNRC_2H_4OOCC(CH_3)=CH_2$ wherein n is an integer from 4 to 18, and R is H or C1-C20 alkyl. In some embodiments R is H. In some embodiments, R is C1-C6 alkyl. In some embodiments, R is C1-C10 alkyl. In some embodiments, R is C1-C20 alkyl. Additionally, in some embodiments, urethane waxes of the phase change agent comprise ADS038 [1-dodecyl-N-octadecyl carbamate: $CH_3(CH_2)_{17}NHCOO(CH_2)_{11}CH_3$] and/or ADS043 [1-hexadecyl-N-octadecyl carbamate: $CH_3(CH_2)_{17}NHCOO(CH_2)_{15}CH_3$] waxes commercially available from American Dye Source, Inc. of Baie D'Urfe, Quebec, Canada.

In some embodiments, a phase change agent comprises a mixture of urethane waxes. In one embodiment, for example, a phase change agent comprises a mixture of ADS038 and ADS043. Moreover, a phase change agent of a support material described herein has freezing and melting points consistent with temperatures encountered in 3D printing systems. In some embodiments, the freezing point of a phase change agent is greater than about 40° C.

A phase change agent can be present in a support material described herein in any amount not inconsistent with the objectives of the present invention. In some embodiments, a phase change agent is present in a support material described herein in an amount of up to about 5 weight percent. In some embodiments, a phase change agent is present in a support material in an amount ranging from about 0.1 weight percent to about 5 weight percent or from about 0.5 weight percent to about 4 weight percent. In some embodiments, a phase change agent is present in a support material in an amount ranging from about 1 weight percent to about 3 weight percent.

A support material described herein, in some embodiments, further comprises one or more stabilizing agents. In some embodiments, a stabilizing agent comprises one or more anti-oxidants. A stabilizing agent can comprise any anti-oxidant not inconsistent with the objectives of the present invention. In some embodiments, for example, suitable anti-oxidants include various aryl compounds, including butylated hydroxytoluene (BHT).

A stabilizing agent can be present in a support material in any amount not inconsistent with the objectives of the present invention. In some embodiments, a stabilizing agent is present in a support material in an amount ranging from about 0.1 weight percent to about 5 weight percent or from about 0.5 weight percent to about 4 weight percent. In some embodiments, a stabilizing agent is present in a support material in an amount ranging from about 1 weight percent to about 3 weight percent.

A support material described herein has a melting point and a freezing point consistent with the temperature parameters of one or more 3D printing systems. In some embodiments, a support material has a melting point ranging from about 45° C. to about 70° C. In some embodiments, a support material has a melting point ranging from about 50° C. to about 65° C. or from about 55° C. to about 63° C. In some embodiments, a support material has a melting point ranging from about 60° C. to about 62° C. Moreover, in some embodiments, a support material described herein has a freezing point ranging from about 45° C. to about 55° C. In some embodiments, a support material has a freezing point ranging from about 47° C. to about 52° C. or from about 49° C. to about 51° C.

In some embodiments, a support material has a viscosity consistent with the requirements and parameters of one or more 3D printing systems. In some embodiments, a support material described herein has a viscosity ranging from about 9.0 centipoise to about 14.0 centipoise at a temperature of about 65° C. In some embodiments, a support material has a viscosity ranging from about 9.5 centipoise to about 12.0 centipoise at a temperature of about 65° C. A support material, in some embodiments, has a viscosity ranging from about 10.0 centipoise to 11.0 centipoise at a temperature of about 65° C.

In some embodiments, a support material described herein has a viscosity ranging from about 10.0 centipoise to about 19.0 centipoise at a temperature of about 80° C. A support material, in some embodiments, has a viscosity ranging from about 11.0 centipoise to about 14.0 centipoise at a temperature of about 80° C. In some embodiments, a support material has a viscosity ranging from about 11.5 centipoise to about 13.5 centipoise or from about 12.0 centipoise to about 13.0 centipoise at a temperature of about 80° C.

In some embodiments, a support material described herein is non-curable. Moreover, in some embodiments, a support material described herein is self-emulsifying when contacted with water or a continuous aqueous phase. In some embodiments, an aqueous dispersion of a support material described herein can be directly disposed of in a wastewater treatment system without further chemical and/or physical processing prior to entry into the wastewater treatment system. In some embodiments, for example, an aqueous dispersion of a support material described herein can be disposed of in a municipal wastewater treatment system without further chemical and/or physical processing or treatment prior to entry into the municipal wastewater treatment system. Additionally, in some embodiments, a support material described herein is biodegradable.

In some embodiments, a support material described herein is non-curable or does not polymerize or substantially polymerize when irradiated with electromagnetic radiation used in free radical polymerizations.

In another aspect, compositions comprising three-dimensionally printed articles or objects are described herein. In some embodiments, a composition comprises a three-dimensionally printed article comprising a build material and a support material, the support material comprising a wax component comprising at least one ethoxylated fatty alcohol and a viscosity modifying component as described herein. In some embodiments, a composition comprises a three-dimensionally printed article comprising a build material and a support material, the support material comprising a wax component comprising a mixture of at least one fatty alcohol and at least one ethoxylated fatty alcohol and a viscosity modifying component as described herein. A three-dimensionally printed article or object can comprise any embodiment of a support material described herein.

As provided herein, the support material of a three-dimensionally printed article supports one or more layers of build material used in the fabrication of the article. A build material, in some embodiments, comprises a curable material. In some embodiments, a curable material comprises one or more photo-curable chemical species. In some embodiments, a photo-curable material comprises one or more UV curable chemical species. In some embodiments, any suitable curable material known to one of ordinary skill in the art and not inconsistent with the objectives of the present invention may be included in a build material as described herein.

In some embodiments, a UV curable species of a build material described herein comprises one or more species of (meth)acrylates. As used herein, (meth)acrylate includes acrylate or methacrylate or mixtures or combinations thereof. In some embodiments, a build material comprises urethane (meth)acrylate resins. UV curable urethane (meth)acrylate resins can comprise any methacrylate or acrylate resin which polymerizes in the presence of a free radical photoinitiator, is thermally stable in an exposed state for at least one week at the jetting temperature and for at least 4 weeks in an enclosed state, and has a boiling point greater than the jetting temperature. In some embodiments, a urethane (meth)acrylate has a flash point above the jetting temperature and provides a tough, high modulus polymer when aggregated with other (meth)acrylate monomers and/or oligomers. In some embodiments, (meth)acrylates are curable at wavelengths ranging from about 300 nm to about 400 nm. Alternatively, in some embodiments, (meth)acrylates are curable at visible wavelengths of the electromagnetic spectrum.

Urethane (meth)acrylates suitable for use in build materials described herein can be prepared in a known manner, typically by reacting a hydroxyl-terminated polyurethane with acrylic acid or methacrylic acid to give the corresponding urethane acrylate or by reacting an isocyanate-terminated prepolymer with hydroxyalkyl acrylates or methacrylates to give the urethane acrylate. Suitable processes are disclosed, inter alia, in EP-A 114 982 and EP-A 133 908. The molecular weight of such acrylates is generally in the range from about 400 to 10,000, preferably from about 500 to 7,000. Urethane acrylates are also commercially available from the SARTOMER Company under the product names CN980, CN981, CN975 and CN2901.

In some embodiments, urethane (meth)acrylate is present in the build material composition in an amount ranging from about 10 weight percent to about 50 weight percent. Urethane (meth)acrylate, in some embodiments, is present in the build material composition in an amount ranging from about 20 weight percent to about 40 weight percent.

In some embodiments, a build material of a three-dimensionally printed article or object described herein further comprises one or more waxes. In some embodiments, suitable waxes comprise hydrocarbon waxes, including hydrogenated waxes, paraffin waxes, microcrystalline waxes, fatty ester waxes or mixtures thereof. In some embodiments, suitable waxes comprise one or more urethane waxes. Urethane waxes, in some embodiments, comprise mono-, di- or higher functionality.

In some embodiments, a urethane wax of a build material is selected from a class of inert linear urethane waxes having the chemical formula $C_{18}H_{37}NRCOOC_nH_{(2n+1)}$ wherein n is an integer from 4 to 16, and R is H or C1-C20 alkyl. In some embodiments R is H. In some embodiments, R is C1-C6 alkyl. In some embodiments, R is C1-C10 alkyl. In some embodiments, R is C1-C20 alkyl. In some embodiments, a urethane wax is selected from a class of reactive linear urethane waxes having the formula $C_nH_{(2n+1)}NRC(O)OC_mH_{2m}OC(O)C(CH_3)=CH_2$ wherein n is an integer from about 12 to about 18, m is an integer from about 2 to about 12, and R is H or C1-C20 alkyl. In some embodiments R is H. In some embodiments, R is C1-C6 alkyl. In some embodiments, R is C1-C10 alkyl. In some embodiments, R is C1-C20 alkyl. A urethane wax, in some embodiments, is selected from a class of reactive urethane waxes having the formula $C_nH_{(2n+1)}O(O)CNRC_2H_4OOCC(CH_3)=CH_2$ wherein n is an integer from about 4 to about 18, and R is H or C1-C20 alkyl. In some embodiments R is H. In some embodiments, R is C1-C6 alkyl. In some embodiments, R is C1-C10 alkyl. In some embodiments, R is C1-C20 alkyl. Additionally, in some embodiments, urethane waxes of the build material comprise ADS038 [1-dodecyl-N-octadecyl carbamate: $CH_3(CH_2)_{17}NHCOO(CH_2)_{11}CH_3$] and/or ADS043 [1-hexadecyl-N-octadecyl carbamate: $CH_3(CH_2)_{17}NHCOO(CH_2)_{15}CH_3$] waxes commercially available from American Dye Source, Inc. of Baie D'Urfe, Quebec, Canada.

In some embodiments, a build material comprises a mixture of urethane waxes. In one embodiment, for example, a build material comprises a mixture of ADS038 and ADS043. Moreover, build materials used in embodiments of the present invention can have any suitable freezing and melting points not inconsistent with the objectives of the present invention. In some embodiments, a build material has freezing and melting points consistent with temperatures used in some 3D printing systems. In some embodiments, the freezing point of a build material is greater than about 40° C. In some embodiments, for example, a build material has a freezing point ranging from about 45° C. to about 55° C. In some embodiments, a build material has a melting point ranging from about 50° C. to about 80° C. A build material, in some embodiments, has a melting point ranging from about 50° C. to about 60° C. In some embodiments, the freezing point of a build material is lower than about 40° C. or lower than about 25° C.

In some embodiments, a build material further comprises one or more (meth)acrylic diluents. Any (meth)acrylic diluent not inconsistent with the objectives of the present invention can be used. In some embodiments, a (meth) acrylic diluent has a viscosity less than about 13 centipoise. Moreover, in some embodiments, a (meth)acrylic diluent is monofunctional or polyfunctional.

One or more diluents, in some embodiments, are added to the build material to control viscosity, but can also improve the other physical properties of the material including improving adhesion of the cured composition to the build platform. In some embodiments, an amount of (meth)acrylate diluent in the build material ranges from about 10 weight percent to about 60 weight percent. For low molecular weight materials, methacrylates, dimethacrylates, triacrylates, and diacrylates can be used in a variety of combinations. These include tetrahydrofurfuryl methacrylate, triethylene glycol dimethacrylate, 2-phenoxyethyl methacrylate, lauryl methacrylate, ethoxylated trimethyloipropane triacrylate, polypropylene glycol monomethacrylate, polyethylene glycol monomethacrylate, cyclohexane dimethanol diacrylate, and tridecyl methacrylate.

In some embodiments, a (meth)acrylic diluent comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl) methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

A (meth)acrylic diluent, in some embodiments, comprises one or more tri(meth)acrylates. In some embodiments, tri (meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate.

In some embodiments, a (meth)acrylic diluent of a build material comprises one or more higher functional acrylates or methacrylates such as dipentaerythritol monohydroxy pentaacrylate or bis(trimethylolpropane) tetraacrylate. In some embodiments, a (meth)acrylate diluent has a molecular weight ranging from about 250 to 700.

In some embodiments, a diluent is selected from the group consisting of allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate and n-dodecyl (meth)acrylate, 2-hydroxyethyl (meth)acrylate, 2- and 3-hydroxypropyl (meth)acrylate, 2-methoxyethyl(meth)acrylate, 2-ethoxyethyl (meth)acrylate and 2- or 3-ethoxypropyl (meth)acrylate, tetrahydrofurfuryl methacrylate, 2-(2-ethoxyethoxy)ethyl acrylate, cyclohexyl methacrylate, 2-phenoxyethyl acrylate, glycidyl acrylate and isodecyl acrylate.

As a build material described herein comprises one or more curable compounds, a build material, in some embodiments, further comprises one or more photoinitiators. Any photoinitiator not inconsistent with the objectives of the present invention can be used in build materials described herein. In some embodiments, a suitable photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 365 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer amine combination is Darocur BP (CAS 119-61-9) with diethylaminoethylmethacrylate. The chemical structures of these photoinitiators are provided below:

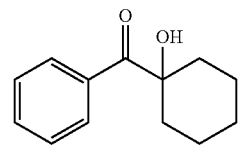

Irgacure 184

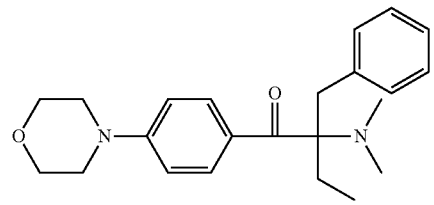

Irgacure 369

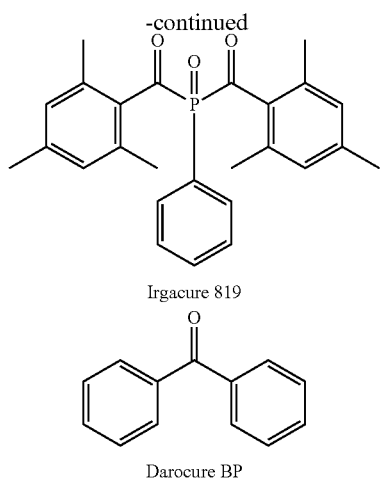

Irgacure 819

Darocure BP

In some embodiments, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chioroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

In some embodiments, suitable photoinitiators comprise those operable for use with a HeCd laser radiation source, including acetophenones, conveniently 2,2-dialkoxybenzophenones and 1-hydroxyphenyl ketones, for example 1-hydroxycyclohexyl phenyl ketone or 2-hydroxyisopropyl phenyl ketone (=2-hydroxy-2,2-dimethylacetophenone). Additionally, in some embodiments, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators comprises ionic dye-counter ion compounds capable of absorbing actinic radiation and generating free radicals for polymerization initiation. In some embodiments, compositions containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530 and 4,772,541.

In some embodiments, a photoinitiator is present in a build material in an amount of up to about 5 weight percent. In some embodiments, a photoinitiator is present in a build material in an amount ranging from about 0.1 weight percent to about 5 weight percent.

A build material, in some embodiments, further comprises one or more polymerization inhibitors. In some embodiments, a polymerization inhibitor comprises methoxyhydroquinone (MEHQ). A polymerization inhibitor can be added to a build material to provide additional thermal stability to the composition. In some embodiments, a polymerization inhibitor is present in a build material in an amount ranging from about 0.1 weight percent to about 2 weight percent. A polymerization inhibitor, in some embodiments, is present in a build material in an amount ranging from about 0.5 weight percent to about 1 weight percent.

In some embodiments, a build material in the non-cured state has one or more of the following properties:
1. Melting point from about 45° C. to about 65° C. (MP must be less than the jetting temperature);
2. Freezing point from about 33° C. to about 60° C.;
3. Jetting viscosity of about 10 to about 16 cPs at 70° C.-95° C.; and
4. Thermally stable for at least 3 days at the jetting temperature In some embodiments, a build material in the non-cured state has one or more of the following properties:
1. Melting point lower than about 25° C. (the melting point must be less than the jetting temperature but need not be at or above room temperature);
2. Freezing point lower than about 25° C.;
3. Jetting viscosity of about 10 to about 19 cPs at 70° C.-95° C.; and
4. Thermally stable for at least 3 days at the jetting temperature Moreover, when in the cured state, a build material described herein, in some embodiments, can have one or more of the following properties:
1. Tensile Strength of at least 2,000 psi;
2. Tensile Modulus of at least 100,000 psi;
3. Tensile elongation of at least 9%;
4. Hardness of at least 60 shore D;
5. Impact Strength of at least 0.2 ft-lb/in (Izod notched);
6. Flexural Strength of at least 1,500 psi; and
7. Flexural Modulus of at least 2,500 psi.

In some embodiments, a build material is produced by placing all components of the build material in a reaction vessel and heating the resulting mixture to temperature ranging from about 75° C. to about 95° C. with stirring. The heating and stirring are continued until the mixture attains a substantially homogenized molten state. The molten mixture is filtered while in a flowable state to remove any large undesirable particles that may interfere with jetting. The filtered mixture is then cooled to ambient temperatures until it is heated in the ink jet printer.

In some embodiments, a three dimensionally printed article described herein comprises a plurality of layers of the build material, wherein the layers of the build material are deposited according to data in a computer readable format. Moreover, at least one of the deposited layers of build material is supported by a support material described herein. The support material is removable to complete production of the three-dimensionally printed article or object.

In another aspect, methods of printing a three-dimensional article or object are described herein. In some embodiments, a method of printing a three-dimensional article comprises selectively depositing layers of a fluid build material to form the three-dimensional article on a substrate, and supporting at least one layer of the build material with a support material, the support material comprising a wax component comprising at least one ethoxylated fatty alcohol and a viscosity modifying component. In some embodiments, a method of printing a three-dimensional article comprises selectively depositing layers of a fluid build material to form the three-dimensional article on a substrate, and supporting at least one layer of the build material with a support material, the support material comprising a wax component comprising a mixture of at least one fatty alcohol and at least one ethoxylated fatty alcohol and a viscosity modifying component. In some embodiments of methods of printing a three-dimensional article, the support material can comprise any embodiment of a support material described herein. Moreover, in some embodiments of methods of printing a three-dimensional article, the build material can comprise any embodiment of a build material described herein.

In some embodiments, a method of printing a three-dimensional article further comprises curing the build material. In some embodiments, a method of printing a three-dimensional article further comprises subjecting the build material to electromagnetic radiation of sufficient wavelength and intensity to cure the build material. In some embodiments of printing a three-dimensional article, a layer of deposited build material is cured prior to the deposition of another or adjacent layer of build material.

In some embodiments, a preselected amount of build material described herein is heated to the appropriate temperature and jetted through the print head or a plurality of print heads of a suitable inkjet printer to form a layer onto a build support platform in a build chamber. Each layer of build material is deposited according to the preselected CAD parameters. A suitable print head to deposit the build material, in one embodiment, is the piezoelectric Z850 print head available from Xerox Corporation's Office Products Business Unit in Wilsonville, Oreg. Additional suitable print heads for the deposition of build and support materials described herein are commercially available from a variety of ink jet printing apparatus manufacturers. For example, the Taipan print head available from Xerox or Ricoh print heads may also be used in some embodiments.

In some embodiments, the temperature of the build environment can be controlled so that the jetted droplets of build material solidify on contact with the receiving surface. In other embodiments, the jetted droplets of build material do not solidify on contact with the receiving surface, remaining in a substantially fluid state. In some embodiments, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some embodiments, the wiper device comprises a roller and a wiper that removes excess material from the roller. In some embodiments, the wiper device is heated. The process is continued until a useful finished three-dimensional design is prepared. It should be noted that the consistency of the jetted build material of the present invention prior to curing must be sufficient to retain its shape and not be subject to excessive viscous drag from the planarizer.

Moreover, the support material, in some embodiments, can be deposited in a manner consistent with that described herein for the build material. The support material, for example, can be deposited according to the preselected CAD parameters such that the support material is adjacent or continuous with one or more layers of the build material. Jetted droplets of the support material, in some embodiments, solidify or freeze on contact with the receiving surface. In some embodiments, the deposited support material is also subjected to planarization.

Layered deposition of the build material and support material can be repeated until the three-dimensional article has been formed. In some embodiments, a method of printing a three-dimensional article further comprises removing the support material from the build material. As support materials described herein are water dispersible and/or at least partially water soluble, removing the support material from the build material, in some embodiments, comprises dispersing the support material in water. Dispersing the support material in water, in some embodiments, comprises contacting the support material with flowing water. In some embodiments, dispersing the support material in water comprises at least partially immersing the three-dimensionally printed article in a water bath. In some embodiments, the water bath is stirred during immersion of the three-dimensionally printed article.

In some embodiments, water used in the removal of a support material from the build material is heated. Water used for the removal of a support material can be heated to any desired temperature not inconsistent with the objectives of the present invention. In some embodiments, water for the removal of the support material can be heated to any temperature that does not deform or substantially deform or compromise the structure of the build material of the three-dimensionally printed article. In some embodiments, for example, water for removal of the support material is heated to a temperature ranging from about 40° C. to about 70° C. Water for the removal of the support material, in some embodiments, is heated to a temperature ranging from about 50° C. to about 60° C. In some embodiments, water for the removal of a support material is heated to a temperature ranging from about 60° C. to about 70° C. or from about 60° C. to about 65° C.

In some embodiments, one or more surfactants or detergents can be added to water used to remove the support material from the build material. Additionally, in some embodiments, the support material can be subjected to mechanical agitation. In some embodiments, mechanical agitation of the support material is administered by contacting the support material with flowing or jetted water. In some embodiments, the support material can be subjected to ultrasonic agitation to remove the support material from the build material. In some embodiments, the support material can be subjected to a combination of mechanical and ultrasonic agitation to remove the support material from the build material.

Additionally, in some embodiments, a method of printing a three-dimensional article further comprises disposing of the support material dispersed and/or at least partially solubilized in water without further treatment. In some embodiments, an aqueous dispersion of a support material described herein can be disposed of in a wastewater treatment system without further chemical and/or physical processing prior to entry into the wastewater treatment system. In some embodiments, for example, an aqueous dispersion of a support material described herein can be disposed of in a municipal wastewater treatment system without further chemical and/or physical processing or treatment prior to entry into the municipal wastewater treatment system.

Embodiments described herein are further illustrated in the following non-limiting examples.

Example 1

Water Dispersible Phase Change Support Material

A water dispersible phase change support material consistent with embodiments described herein was provided in accordance with the formulation of Table I.

TABLE I

Water Dispersible Phase Change Support Material

| Component | Amount (Wt. %) |
|---|---|
| Wax Component[1] | 92.5 |
| Viscosity Modifying Component[2] | 7.5 |

[1]Permulgin D-Koster Keunen, Inc. of Watertown, CT.
[2]Ethoxylated Fatty Alcohol-Ethox SA 20-Ethox Chemicals, LLC, Greenville, SC 29606.

The wax component (925 grams) and the viscosity modifying component (75 grams) were charged into a vessel equipped with mechanical stirring and a heating unit. The mixture was then heated to about 80° C.-90° C. After the mixture was melted, stirring was begun, and the mixture was blended for about 1-2 hours at 80° C.-90° C. The liquid was then filtered with a 1 micron filter to remove solid particles. The support material provided in Table I had a viscosity of 10.5 centipoise at a temperature of 65° C.

The resulting support material was jetted with UV curable build material at about 65° C.-68° C. through a Project 3000 System from 3D Systems using a Xerox Z 850 print head to form three dimensional parts. To remove the support material, the three dimensional parts were cleaned with agitation in warm water (55° C.-65° C.) containing 0.5-1% detergent (Lotion Hand Soap, McCalla Company, Van Nuys, Calif. 91405).

Example 2

Water Dispersible Phase Change Support Material

A water dispersible phase change support material consistent with embodiments described herein was provided in accordance with the formulation of Table II.

TABLE II

Water Dispersible Support Material

| Component | Amount (Wt. %) |
|---|---|
| Wax Component[3] | 82.4 |
| Viscosity Modifying Component[4] | 14.0 |
| Phase Change Agent[5] | 2.0 |
| Stabilizer[6] | 1.6 |

[3]Permulgin D-Koster Keunen, Inc. of Watertown, CT.
[4]Capa 1301-Perstorp UK Limited, Baronet Road, Warrington, Chester WA4 6HA.
[5]50/50 mixture of ADS038 and ADS043-American Dye Source Inc. of Baie D'Urfe, Quebec, Canada.
[6]Butylated hydorxytoluene (BHT)-Chemtura Corp., Middlebury, CT 06749.

The wax component (824 grams) was weighed in a glass jar fitted with a mechanical stirrer. A hot plate was used to heat the glass jar to about 80-90° C. The viscosity modifying component (140 grams), the phase change agent (20 grams), and the stabilizer (16 grams) were then added to the glass jar at the same time. The temperature was maintained at about 80-90° C. and stirring was continued for 2-4 hours to melt and provide homogeneous mixing of the components. The support material was than filtered through a one micron filter to remove solid particles. The support material was then placed in cartridges for use in three dimensional printing.

The water dispersible phase change support material provided in Table II had a viscosity of about 13 centipoise at a temperature of about 78° C. and was successfully jetted for 3D printing applications at temperatures of 75° C. and 77° C. through a Projet 3000 System from 3D Systems using a Xerox Z 850 print head. The support material was water dispersible and at least partially water soluble when contacted with water at a temperature of 63° C.

Example 3

Water Dispersible Phase Change Support Material

A phase change support material consistent with embodiments described herein was provided in accordance with the formulation of Table III.

TABLE III

Water Dispersible Support Material

| Component | Amount (Wt. %) |
|---|---|
| Wax Component[7] | 80.0 |
| Viscosity Modifying Component[8] | 10.0 |
| Viscosity Modifying Component[9] | 7.0 |
| Phase Change Agent[10] | 2.0 |
| Stabilizer[11] | 1.0 |

[7]Permulgin D-Koster Keunen, Inc. of Watertown, CT.
[8]Capa 1301-Perstorp UK Limited, Baronet Road, Warrington, Chester WA4 6HA.
[9]Ethoxylated Fatty Alcohol-Ethox MS40-Ethox Chemicals, LLC, Greenville, SC 29606.
[10]50/50 mixture of ADS038 and ADS043-American Dye Source Inc. of Baie D'Urfe, Quebec, Canada.
[11]Butylated hydorxytoluene (BHT)-Chemtura Corp., Middlebury, CT 06749.

The wax component (800 grams) was weighed in a glass jar fitted with a mechanical stirrer. A hot plate was used to heat the glass jar to about 80° C. The first viscosity modifying component (100 grams), the second viscosity modifying component (70 grams), the phase change agent (20 grams), and the stabilizer (10 grams) were then added to the glass jar at the same time. The temperature was maintained at about 80° C. and stirring was continued for 2-4 hours to provide homogeneous mixing of the components. The support material was than filtered through a one micron filter to remove solid particles. The support material was then placed in cartridges for use in three dimensional printing.

The water dispersible phase change support material provided in Table III had a viscosity of about 13 centipoise at a temperature of about 78° C. and was successfully jetted for 3D printing applications at temperatures of 75° C. and 77° C. through a Projet 3000 System from 3D Systems using a Xerox Z 850 print head. The support material was water dispersible and at least partially water soluble when contacted with water at a temperature of 63° C.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three dimensional article comprising:
   selectively depositing layers of a fluid build material to form the three-dimensional article on a substrate; and
   supporting at least one of the layers of the build material with a support material, the support material comprising:
      a wax component comprising at least one ethoxylated fatty alcohol;
      a viscosity modifying component; and
      a phase change agent operable to accelerate the freezing of the support material when the support material is deposited in a three-dimensional printing system,
   wherein the phase change agent comprises a urethane wax that freezes or solidifies over a range of 1° C. to 3° C., and
   wherein the support material is water dispersible following deposition of the support material in the three-dimensional printing system.

2. The method of claim 1, wherein the layers of the build material are deposited according to an image of the three dimensional article in a computer readable format.

3. The method of claim 2, wherein the build material is deposited according to preselected computer aided design (CAD) parameters.

4. The method of claim 1 further comprising curing the build material.

5. The method of claim 1 further comprising removing the support material from the build material by contacting the support material with water.

6. The method of claim 5, wherein the support material is dispersed in the water to provide an aqueous dispersion.

7. The method of claim 6 further comprising disposing of the aqueous dispersion of the support material in a wastewater treatment system without further treatment prior to entry of the aqueous dispersion into the wastewater treatment system.

8. The method of claim 1, wherein the build material solidifies upon deposition.

9. The method of claim 1, wherein the build material remains substantially fluid upon deposition.

* * * * *